United States Patent [19]
Klenk et al.

[11] Patent Number: 5,255,560
[45] Date of Patent: Oct. 26, 1993

[54] APPARATUS AND PROCESS FOR MEASURING THE IRREGULAR RUNNING OF AN INTERNAL COMBUSTION ENGINE AND APPLICATION OF THE PROCESS

[75] Inventors: Martin Klenk, Backnang; Winfried Moser, Ludwigsburg, both of Fed. Rep. of Germany

[73] Assignee: Robert Bosch GmbH, Stuttgart, Fed. Rep. of Germany

[21] Appl. No.: 777,409

[22] PCT Filed: May 14, 1990

[86] PCT No.: PCT/DE90/00346
§ 371 Date: Jan. 31, 1992
§ 102(e) Date: Jan. 31, 1992

[87] PCT Pub. No.: WO90/15235
PCT Pub. Date: Dec. 3, 1990

[30] Foreign Application Priority Data
Jun. 2, 1989 [DE] Fed. Rep. of Germany ....... 3917978

[51] Int. Cl.$^5$ ............................................. G01M 15/00
[52] U.S. Cl. .................................. 73/116; 364/431.07
[58] Field of Search ............... 73/116, 117.2; 123/419; 364/431.07

[56] References Cited

U.S. PATENT DOCUMENTS

| | | | |
|---|---|---|---|
| 3,972,230 | 8/1976 | Hanson et al. | 73/116 |
| 4,123,935 | 11/1978 | Maringer | 73/116 |
| 4,608,536 | 8/1986 | Jacobs et al. | 73/116 |
| 5,040,412 | 8/1991 | Wannenwetsch | 73/116 |
| 5,044,195 | 9/1991 | James et al. | 73/117.3 |
| 5,044,336 | 9/1991 | Fukui | 73/116 |

*Primary Examiner*—Jerry W. Myracle
*Attorney, Agent, or Firm*—Kenyon & Kenyon

[57] ABSTRACT

To measure the irregular running of an internal combustion engine, the following equation, for the running irregularity value (LUW) is applied:

$$LUW = f(T) \times |(T\_V2 - T\_V1) - (T\_V3 - T\_V2)|.$$

The values $T\_V1$, $T\_V2$ and $T\_V3$ are combustion time periods, as they are measured at any one time between two fixed segment marks. Different groups of running irregularity values are formulated, which differ in that combustion time periods are applied in the mentioned equation for different combinations of cylinders. In each group, the running-irregularity values are averaged; and the difference between the minimum and the maximum value of the averaged values is formulated. The difference is evaluated as a variable for the extent of running irregularity.

16 Claims, 2 Drawing Sheets

APPARATUS AND PROCESS FOR MEASURING THE IRREGULAR RUNNING OF AN INTERNAL COMBUSTION ENGINE AND APPLICATION OF THE PROCESS

FIELD OF THE INVENTION

The present invention relates to a process for measuring the irregular running of an internal combustion engine. As a rule, irregular running results from misfiring. It is detected, for example, from the occurrence of knocking noises near a knocking sensor or as the result of considerable fluctuations in the mean pressure of the combustion chamber. Other processes make use of fluctuations in the angular velocity of the crankshaft. The case at hand concerns such a process.

BACKGROUND OF THE INVENTION

DE 25 07 138 (U.S. Pat. No. 4,044,234) discloses measuring the angular velocity in a given angular interval before the top dead center and the angular velocity in a same angular interval after the top dead center of a cylinder situated in the expansion stroke. If the difference between the two values falls below a specified threshold value, it is concluded that the combustion in the monitored cylinder has failed. The mentioned differential measurement is performed for all the cylinders of an internal combustion engine. When one of the differential values falls below the specified threshold value, a misfiring is recognized.

Measurements for individual cylinders are also performed in a process as described in an article by I. Geiger al titled "Running Irregularity an Input Variable for Control Processes" in the conference report for the 8th *Viennese Motor Symposium* 1897, S. 277-295. A measurement is performed for each cylinder in an angular interval after the top dead center for three successive expansion strokes V1, V2 and V3. The time period $T\_V1$, T V2 or $T\_V3$ in which the crankshaft rotates by a specified angular interval is always measured. The runningirregularity value LUW is calculated according to the following formula:

$$LUW = f(T) \times |(T\_V2 - T\_V1) - (T\_V3 - T\_V2),| \quad (1)$$

whereby: $f(T) = 1/T\_V1^3$ or $1/(T\_V1 \times T\_V2 \times T\_V3)$

The thus calculated running-irregularity value is applied in an idle speed control.

Unlike the above-mentioned processes, runningirregularity values are able to be determined not by applying successive expansion strokes of a same cylinder in the equation (1) indicated above as expansion strokes V1, V2 and V3 in which measurements are performed, but rather by applying immediately successive expansion strokes. Such a process is described in an article by V. Bianchi et al. titled "A Simple and Objective Process for Measuring Irregular Running" in MTZ 39/1978, Nr. 7/8, S. 1-5. The mentioned article does not specifically describe processes which make use of calculated runningirregularity values.

In practice, however, the process just mentioned leads again and again to false information, since the influences of the road and gear unit prove to be disturbing. Therefore, one has been confronted for quite some time with the problem of specifying a more reliable process for measuring running irregularity.

SUMMARY OF THE INVENTION

In the process according to the present invention, the running-irregularity values LUW are calculated according to equation (1) with time periods for different groups of cylinders, the maximum value and the minimum value of the calculated groups are determined, and the difference between the minimum value and the maximum value is calculated. This measure has the advantage, inter alia, that the running irregularity caused by ignition misfiring can be separated from the running irregularity caused by driving on rough roads. In the latter case, changes in angular velocity can occur on the crankshaft which are similar with respect to frequency and amplitude variations to those caused by ignition misfiring. All the running-irregularity values then rise above the commonly specified threshold value. If, however, the maximum and minimum value are determined, as mentioned, and the mentioned difference is formulated, it turns out that the magnitude of the differential value is largely independent of changes in the moment of rotation that are transferred from the drive wheels to the crankshaft, but that this differential value is, on the contrary, considerably dependent on ignition misfirings.

The mentioned time periods $T\_V1$, $T\_V2$ and $T\_V3$ are measured for the expansion strokes of dissimilar cylinders, which are not adjacent, preferably for those whose beginning and end are determined at any one time by the same segment mark. The advantage of employing cylinders which are not adjacent lies in the fact that the angular velocity of the crankshaft in the expansion stroke for a cylinder which is not adjacent is less affected by an ignition misfiring in a preceding cylinder when the following cylinder is not the adjacent cylinder.

In the preceding and in the following, an "adjacent cylinder" or a "following cylinder" does not mean the next cylinder in the cylinder block, but refers rather to the next cylinder in the expansion stroke sequence. "Opposite cylinders" are those whose expansion strokes are offset from one another by 360°.

If one uses dissimilar cylinders which are not adjacent, in the case of which the angular interval measurement is performed between the same segment marks, any falsification of the measured value due to positional tolerances of the segment marks on a detector which rotates with the crankshaft is ruled out.

According to another process according to the present invention neither the value $1/(T\_V1)^3$ nor the value $1/(T\_V1 \times T\_V2 \times T\_V3)$ is applied for f(T), but rather f(T) is the factor $1/T$, whereby T=one of the times $T\_V1$, $T\_V2$, $T\_V3$. The running-irregularity values LUW calculated with the help of this factor f(T) according to equation (1) are compared in the application of the measuring process for recognizing misfirings to working-point-dependent threshold values, and misfirings are recognized when the threshold value is exceeded. If the third measuring process is applied together with the first measuring process for recognizing misfirings, the group values are calculated with the help of the mentioned function f(T) and the differential values are compared to working-point-dependent threshold values. The advantage of the measure in the third process lies in that because of the working-point dependency of the threshold values, the expression of running irregularity becomes more reliable and, moreover, the evaluation of equation (1) is simplified for each running-irregularity value.

DETAILED DESCRIPTION OF THE INVENTION

Figure 1A:
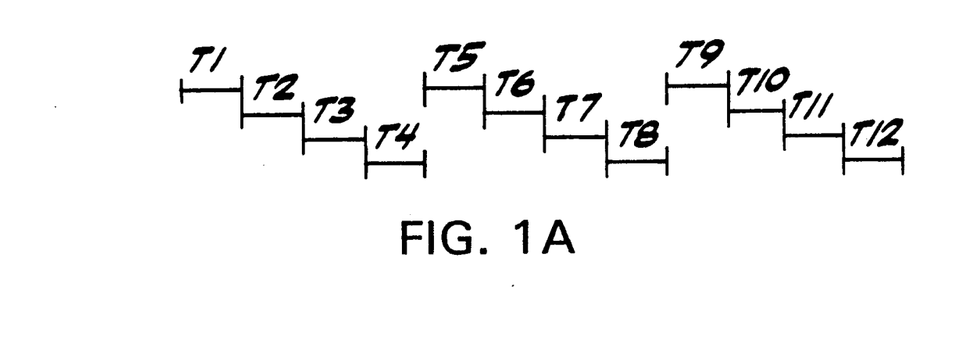
FIG. 1a shows an expansion stroke sequence.

Referring to FIG. 1a, there is graphically illustrated staggered time periods T1-T12. Each time period extends from one of two segment marks S1 and S2 to the other one as shown on the abscissa of FIG. 1b. The segment marks are situated on a detector wheel, which rotates in synchronism with the crankshaft. Two segment marks are provided on a detector wheel on a four-cylinder engine; three segment marks are provided on such a detector wheel for a six-cylinder engine, and so on. The marks are scanned by a sensor, which in the case of a four-cylinder engine emits a signal for every 180° crankshaft angle; in the case of a six-cylinder engine for every 120°, and so on. It is assumed that the segment marks are situated so that a signal from the corresponding sensor is always emitted when a cylinder reaches the top dead center before an expansion stroke (another cylinder reaches the top dead center before an induction stroke).

Determining whether or not a specific crankshaft angle exists with the help of segment marks, and if it does exist, where such a segment mark is situated, is not of importance for the function of the process described in the following. All that is important is that an angular range be able to be recognized for each expansion stroke within which the expansion stroke lies. However, to simplify the clarification of the process, it is assumed that segment marks are provided and that they feature the position explained in the previous paragraph with respect to working strokes. Furthermore, to simplify the illustration, a four-cylinder engine with two segment marks is assumed in the following. In the case of a six-cylinder engine, three segment marks would be provided, and so forth.

The time periods T1-T12 are time periods within which the same angular intervals are bridged over, namely, the angular intervals between two adjacent segment marks. Therefore, the time periods T1-T12 vary dependent upon the rotational speed and dependent upon the running-irregularity effects. One starts from the assumption that in the period of time under consideration in which the time periods T1-T12 lie, the rotational speed changes only slightly The time periods then all lie within one narrow range with a tolerance of a few parts pro mille around the common average value.

In all the processes, the equation (I), set forth above, is applied for the running-irregularity values LUW.

First, the oldest known method based on equation (1) will be clarified, namely the process explained from the above-mentioned article by V. Bianchi et al. In this case, immediately successive time periods are applied for $T\_V1$, $T\_V2$ and $T\_V3$, therefore first T1-T3, then T2-T4, then T3-T5, and so forth. Thus, the first equation reads:

$$LUW = 1/(T1)^3 \times |(T2-T1)-(T3-T2)|$$

In each of the following equations, the number after every "T" is increased by one. The sliding average of all values is taken. The calculated runningirregularity values can be applied further in different processes; however the article does not indicate any specific process.

In the second known method, in accordance with the above mentioned process by Geiger et al., to determine running irregularity on an individual basis for each cylinder, the time periods $T\_V1$, $T\_V2$ and $T\_V3$ are at any one time the time periods of successive expansion strokes for the same cylinder. For the cylinder denoted with number 1, these are the time periods T1, T5 and T9, so that equation (1) reads as follows:

$$LUW = f\_(T) \times |(T5-T1)-(T9-T5)|$$

whereby: $f(T) = 1/(T1)^3$ or $1/(T1 \times T5 \times T9)$

In the following equation for the same cylinder, the numbers after each "T" are increased by four. The sliding average of sequential running-irregularity values for a cylinder is taken in each case. The running-irregularity values are applied in an idle speed control.

Figure 1B:
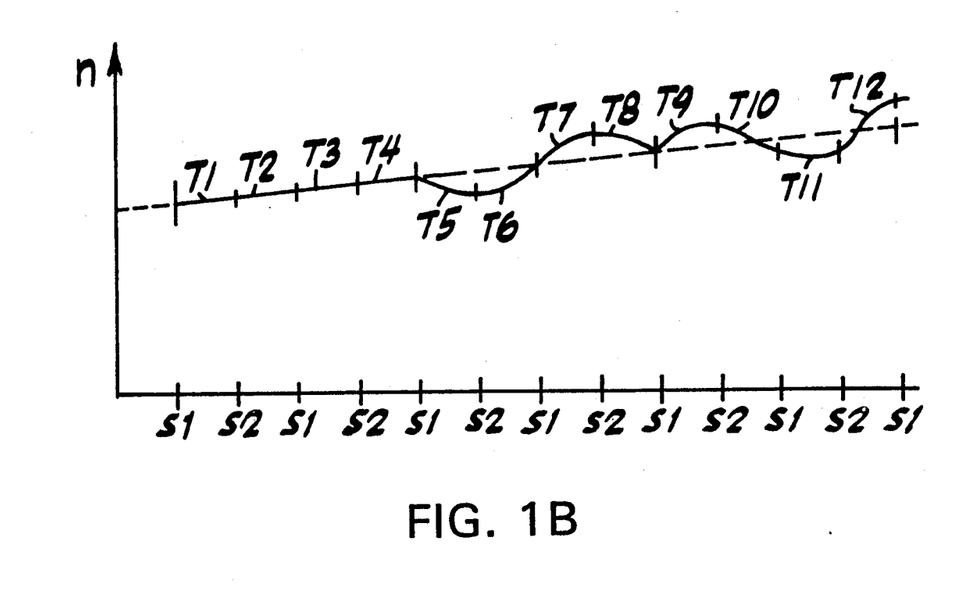
FIG. 1b shows a graph of changes in rotational speed as a function of time for different operating conditions.

Problems which are inherent to this process shall be clarified at this point with the help of FIG. 1b in which it is shown how the average rotational speed n increases with time continuously going up slightly. It is assumed in FIG. 1b that the slight rise in rotational speed in the first four expansion strokes with the time periods T1-T4 takes place in a trouble-free manner. The time periods are then increasingly shorter, with the same shortened value from period to period. The result is that the term within the absolute value symbol in equation (1) becomes zero, provided that the intervals in terms of angle between time periods, with which the differential values in the parentheses are formulated, are the same in each case for both terms in the parentheses. This condition is exactly fulfilled only for the second known method, since in that case the beginning and end of each time period is determined at any one time for one cylinder by the same segment marks. On the other hand, in the first method, different segment marks are used to determine the successive time periods, through which means tolerances in the positions of the segment marks have an effect on the calculation of the running-irregularity values LUW.

Another problem is illustrated in FIG. 1a in the section which contains the time periods T5-T8. In this area, the continuous slight rise in rotational speed is superposed by a rotational-speed oscillation due to ignition misfirings in the first cylinder. Each ignition misfiring results in the rotational speed decreasing in the time period T5, so that this time period becomes somewhat longer than the previous time period T4. After the rotational speed has fallen off as a result of the ignition misfiring in cylinder no. 1, it needs some time to go up again, which is why the expansion-stroke time period T6 for cylinder no. 2 is also prolonged due to a declining rotational speed. Because of control processes, an overshoot then occurs, which is why the engine rotates somewhat faster during the expansion strokes for cylinders no. 3 and 4 than the average rotational speed. Therefore, compared to the average time period, the time periods T7 and T8 are shortened. This fact that an ignition misfiring not only affects the cylinder in which the misfiring takes place, but also particularly affects the following cylinder due to the resulting decline in rotational speed means that when the differences between expansion-stroke time periods are formulated and immediately successive time periods are used, as with the known method 1, misfiring effects can not be recognized clearly enough.

A third problem and indeed the most serious one in practice shall be clarified at this point with reference to the section of FIG. 1a which shows the expansion-stroke time periods T9-T12. Here, as shown in FIG. 1b, it is assumed that the rotational speed n fluctuates somewhat around the slightly increasing average rotational speed, however not due to misfirings, but because torque oscillations from the drive wheels originating from rough ground are transferred to the crankshaft. In FIG. 1b, it is assumed that the amplitude of the transferred oscillation corresponds more or less to the amplitude of an oscillation produced by cylinder misfirings, but that the frequency of the oscillation is slightly higher than the frequency of the rotational-speed oscillation resulting from cylinder misfiring, however that it is very similar to the frequency of the latter oscillation. Using conventional methods, running-irregularity values LUW resulting therefrom are comparable to those caused by ignition misfirings. Therefore, the known methods also deliver a signal indicating a misfiring when the motor vehicle with the monitored internal combustion engine is driven over very rough ground. The conventional methods then mistakenly attempt to reduce the running irregularity by changing the injection of fuel. As a rule, the motor vehicle then becomes slower until the spurious oscillations come into a frequency range in which they no longer have a disturbing effect on the measurement of running irregularity. The motor vehicle then runs faster again until the running irregularity goes up again. This type of control based on a misinterpreted effect is obviously undesirable.

The deficiency just mentioned is overcome according to the present invention in that runningirregularity values are calculated according to equation (1) with time periods for different groups of cylinders, the maximum value and the minimum value of the calculated group values are determined, the difference between the minimum value and the maximum value is calculated, and misfirings are then recognized when the difference exceeds a specified threshold value DLUWS. Examples 1 and 3-5 illustrate this process.

A first group of running-irregularity values is formulated in Example 1. It comprises the immediately successive cylinders 1, 2 and 3 in their expansion stroke. For the first value in this group, it applies that:

$$LUW(G1) = f(T) \times |(T2-T1)-(T3-T2)|$$

To calculate the following values of this group, the number after each "T" is increased by the value four in each case. The sliding average of all sequential values is taken, whereby in the low load ranges, more values are averaged than in the high load ranges, for example about 150 values in the low load ranges and about 50 values in the upper load ranges. This type of averaging is also performed in all the following examples.

For the running-irregularity values in the second group it applies that:

$$LUW(G2) = f(T) \times |(T3-T2)-(T4-T3)|$$

In all the following values for this group the i number after each "T" is again increased by 4. The sliding average of all the values of this group is again taken.

Two further groups could also be formulated, namely those in which the three successive cylinders begin with cylinder no. 3 and those in which the three successive measurements begin with cylinder 4.

Figure 1C:
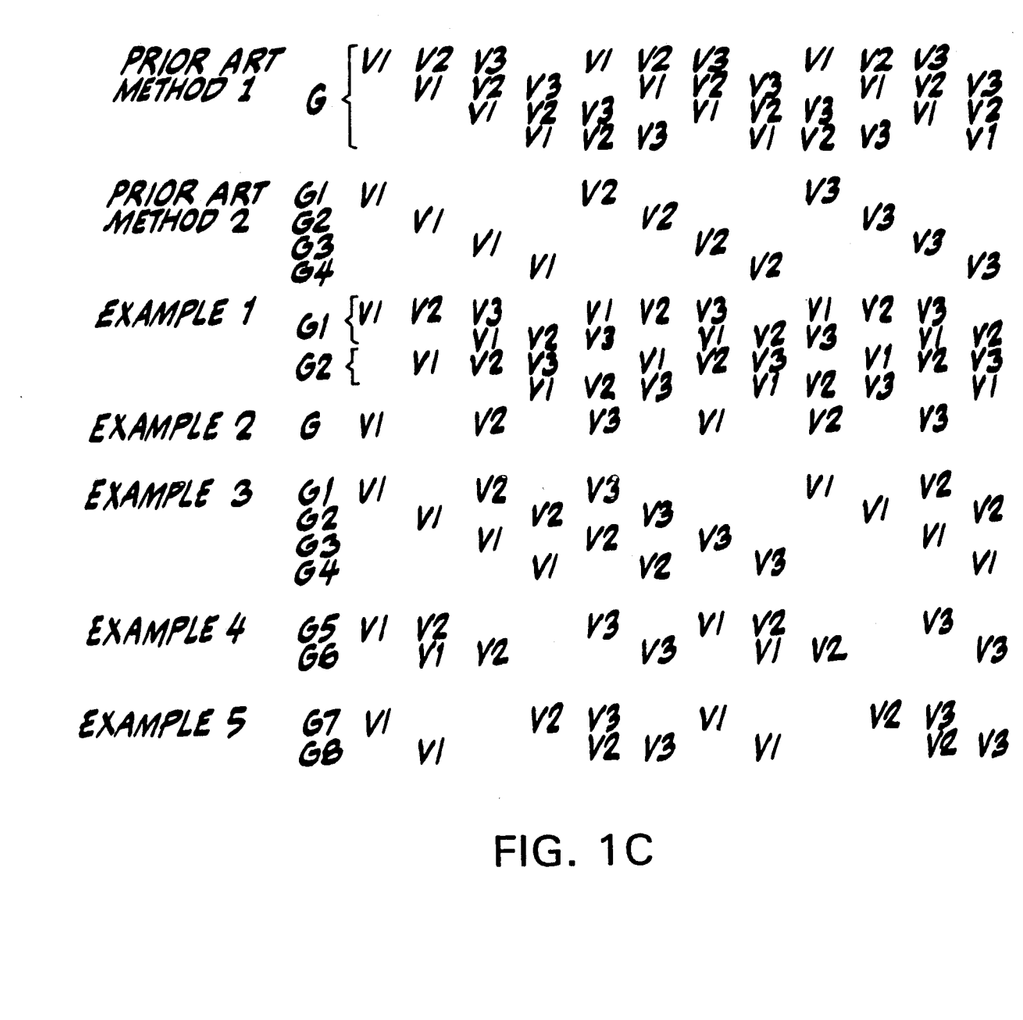
FIG. 1c shows a chart illustrating a correlation between successive expansion strokes V1, V2 and V3 according to equation (1).

Independent of whether only two groups, or three or four groups are formulated, it is significant that the sliding average is taken of all runningirregularity values of one group so that as many running-irregularity values continually exist as there are groups. On the other hand, with the known method 1, all values are combined to form one single sliding-average value, which is then compared to a threshold value. However, in the process according to Example 1, the maximum value and the minimum value are calculated from the sliding-average values for the individual groups. However, this obviously only requires a definite arithmetic operation when more than two groups are formulated. The maximum value and the minimum value are subtracted from each other. When only two groups are present, as depicted in FIG. 1c for Example 1, only the two existing group values are subtracted from each other. The difference DLUW between the minimum value LUW_min and the maximum value LUW_max is compared to a differential threshold value DLUWS. When the difference DLUW rises above the threshold value DLUWS, a misfiring is recognized.

When evaluating the equations to calculate the running-irregularity values LUW, a factor f(T) can be used as customarily calculated, that is a factor which represents in each case the product of the three measured time periods, or which corresponds to the third power of one of the three measured time periods.

However, it is more advantageous to use only such a factor which includes the time in the first power, namely the factor 1/T, whereby T=T_V1, T_V2 or T_V3, preferably T_V2. The running-irregularity values LUW calculated with the help of this factor according to equation (1) are averaged in the usual way. A grouping can thereby be achieved as clarified on the basis of Example 1, according to which the calculated differential value is compared to a working-point-dependent threshold value. This threshold value is preferably read out from a family of characteristics, which is particularly addressable through load and rotational speed values. The linkage of sequential running-irregularity values LUW can take place, however, according to the known method 1 or the known method 2, however with the difference being that, when performing the evaluation, one does not compare to a fixed threshold value, but rather likewise to a working-point-dependent threshold value. In all cases, the advantages of applying a factor of the mentioned type and making the comparison to a workingpoint-dependent threshold value are increased reliability and, in addition, increased computing speed.

In the process according to Example 1, one is still confronted with the problem mentioned above that the calculated running-irregularity values LUW not only depend on different combustion time periods, but also on different relative positions of the segment marks because of mechanical tolerances. These tolerances are able to be excluded when processes are applied as shall be explained at this point on the basis of Examples 2 and 3.

In the process according to Example 2, to evaluate equation (1), three time periods are used whose measurement begins in each case with the same segment mark. These are the time periods T1, T3 and T5. For all these time periods, the time measurement begins when the segment marks S1 are reached and ends when the segment marks S2 are reached. In this process, measurements of time periods are applied only for cylinders no. 1 and 3. Nevertheless, misfirings can also be established when they are conditional upon misfirings in cylinders no. 2 or 4. This is based on the correlations described above.

One can modify Example 2, among other ways, to the effect that in addition to the selection of an expansion stroke depicted in FIG. 1c, one is applied which utilizes values that are offset in each case by one stroke, thus in the first evaluation, the time periods T2, T4 and T6. The sliding average can be taken of all the running-irregularity values LUW from the two cylinder groups and compared in each case to a threshold value.

Another further development of Example 2 shall now be clarified with the help of Example 3. Example 3 embodies a combination of the principles explained on the basis of Examples 1 and 2. Namely, the runningirregularity values of different groups are averaged individually, as explained on the basis of Example 1, and the time periods in the individual groups, whose beginning and end are established, are applied in each case by the same segment marks. For the running-irregularity value LUW (G1) in the first group G1, it applies that:

$$LUW(G1) = f(T)x|(T3-T1)-(T5-T3)|$$

To calculate the following running-irregularity values in the same group, the time periods are used which lie in each case four time periods behind the time periods specified in the equation indicated above.

For the running-irregularity values in the second group G2, it applies that:

$$LUW(G2) = f(T)x|(T4-T2)-(T6-T4)|$$

That which was just specified for the values of group G1 applies accordingly for the succeeding values. The time periods for calculating running-irregularity values for two further groups G3 and G4 are offset in each case by a further time period in comparison with the previously mentioned time periods, as depicted in FIG. 1c in the case of Example 3. The sliding average of the running-irregularity values from the four groups G1–G4 is taken; and the minimum and maximum values of these four group values are determined. The difference is formulated from these two values, and a misfiring is recognized when the difference exceeds a threshold value. Preferably, the factor 1/T is used again for f(T), and working-point-dependent values, which are read out from a family of characteristics, are applied as threshold values. The average time period of the three time periods, as they appear in each case in equation (1), is preferably applied as a time period T for calculating 1/T.

The process according to Example 4 uses the four groups G1–G4 of Example 3 and, moreover, two further groups G5 and G6. The group G5 proceeds, thereby from group G1 because the average expansion-stroke time period is shifted by one time period toward the first time period and is thus directly contiguous to it. Therefore, there is a difference of two time periods to the third time period. Compared to group G1, in group G5 the advantage of having the measurement performed between the same segment marks no longer exists for all time periods, but only for two of the three time periods. However, the new advantage is that two immediately successive time periods go into the evaluation, which improves the possibility of also being able to determine ignition misfirings in the opposite (offset from one another by 360°) expansion strokes. The equation for the first running-irregularity value in group G5 reads:

$$LUW(G5) = f(T)x|(T2-T1)-(T5-T2)|$$

The values for group G6 proceed accordingly from group G3, in the same way as the values for group G5 proceeded from those for group G1; in each case, it is namely the second applied combustion time period value, that is the value which is earlier by one time period. By means of the two groups G5 and G6, combustion time periods are acquired for all four cylinders. There is only a slight improvement in the accuracy of the expression, when additional groups are formed, which proceed in a corresponding way from groups G2 and G4, in the way that groups G5 and G6 proceeded from groups G1 or G3.

The last cited equation for runningirregularity values LUW (G5) is effectively modified still to obtain the value zero when no running irregularity exists. Because the time periods T2 and T1 follow one another immediately, and a gap of two time periods exists between the time periods T5 and T2, the problem arises in case of a slight acceleration, that even when there is no running irregularity, the differential values (T2−T1) and (T5−T2) are not the same and, as a result, a differential value which is not equal to zero follows. To avoid this, the bracket terms are weighted in the inverse proportion of the interval of the time periods they contain. If a gap of one time period exists in each case, as is the case with the bracket terms for groups G1–G4, the weighting factor is 1. If the interval between the two beginnings of the time periods used in one bracket term is only about one half as great, that is, if the time periods are directly contiguous to one another, the weighting factor is 2. If, on the other hand, the interval is twice as great, the weighting factor is 0.5. The equation modified by the weighting factor for LUW (G5) is thus the following:

$$LUW(G5) = f(T)x|(2x(T2-T1)-0.5x(T5-T2))|$$

Example 5 differs from Example 4 in that two further groups G7 and G8 are also applied. Group G7 proceeds similarly from group G1, as group G5 proceeded from group G1. The difference lies in the fact that now the average combustion time period is not moved ahead by one time period, but rather back by one time period and therefore the time periods T1, T4 and T5 are used for the first value. In view of the clarified weighting, it follows consequently for the first value in group G7 that:

$$LUW(G7) = f(T)x|(2x(T4-T1)-0.5x(T5-T4))|$$

For all further running-irregularity values in group G7, time periods are applied which lie in each case four time periods behind the corresponding time periods used in calculating the previous value.

Group G8 proceeds from group G3, corresponding to the way group G7 proceeded from G1. Again, the average time period is no longer situated exactly in the middle between the first and the last combustion time periods, but is rather set back by one time period. Thus the time periods T3, T6 and T7 are used for the first value. Besides the groups G7 and G8, groups could also be used, which do not begin with the time periods for cylinders no. 1 or 3, but rather which start with time periods for cylinders no. 2 or 4.

In Example 5, the sliding average values are continually formulated for groups G1–G8; the minimum value and the maximum value are determined from these sliding average values; the difference from the actual average value at any one time and the actual maximum value at any one time is formulated; and a misfiring is recognized when the difference exceeds a threshold value. The clarifications cited repeatedly above apply to the advantageous selection of the factor f(T) and to the type of threshold value.

The more groups that are used for the described evaluation, the more reliably ignition misfirings are able to be established, even in opposite cylinders, and the less interference prone is the process with respect to irregularity effects, which are transferred from the drive wheels to the crankshaft.

Independent of how many cylinders an engine has, groups are preferably used within which all the applied combustion time periods are measured between the same segment marks. In a four-stroke engine, this condition is fulfilled for every second expansion stroke; in a six-cylinder engine, for every third stroke; and in an eight-cylinder engine, for every fourth stroke. To be able to reliably recognize misfirings in the case of two opposing cylinders, additional groups are used in which the condition just mentioned no longer applies for all time periods. It is rather the average of the three time periods used at any one time that is moved up or back. In the case of a four-cylinder engine, there can be only one move ahead by one time period or back by one time period. On the other hand, in the case of a six-cylinder engine, additional groups can be formed by having an average time period which deviates from the exact middle position as the result of moving ahead or back by one or two time periods. In the case of an eight-cylinder engine, a shift of three time periods ahead or back can be used.

Thus to circumvent the problems occurring in the prior art, four principles are applied. They can be applied together, but also individually. The principles in question are the following:

1. Instead of time periods for the expansion strokes of a same cylinder or immediately successive cylinders, time periods are measured for the expansion strokes of cylinders of which at least two are non-adjacent cylinders (ruling out mechanical errors associated with the marks for initiating the time-period measurements).
2. Individual groups of running-irregularity values are formulated and the difference between the maximum value and the minimum value of the group values is calculated.
3. In the evaluation equation, independent of whether this is otherwise effected with combustion time period values in accordance with a conventional selection or in accordance with the selection of the just mentioned points 1 and/or 2, a factor is used which is inversely proportional only to the first power of the time.
4. In the application of the measuring principles 1–3 for recognizing misfirings, the running-irregularity values or the running-irregularity differential values are compared to threshold values. If running-irregularity values calculated with the help of a factor 1/T, running-irregularity group values or running-irregularity differential values are compared to working-point-dependent threshold values, an increased accuracy of the expression results and, at the same time, the computing speed is increased, since one no longer needs to formulate a third power of a time period.

The embodiments of the present invention relate to applying the measuring processes to the recognition of misfirings. However, the calculated running-irregularity value or running-irregularity differential values can also be used, for example, for idle speed control, for another out-of-true control, or to recognize running irregularity resulting from considerable divergences in the properties of injection valves and their control.

The preceding short description of principle 4 concerns working-point-dependent thresholds values. It is pointed out that, advantageously, the threshold values are not only dependent on the operating point, but also on the specific engine temperature, which is equated as a rule in internal combustion engines with the cooling water temperature. At low temperatures, the threshold value is 10% higher than at the end temperature of about 80° C. As a result, out-of-true engine running at low engine temperatures should be prevented from leading mistakenly to a misfiring recognition. To prevent mistaken recognition of running irregularity, the following measures are also advantageous, which can all be applied individually or together, even together with the measure just described. If rapid load changes are established, the running-irregularity recognition is suppressed as a general principle. A rapid load change is defined in one embodiment according to the present invention as a shifting of the throttle valve by at least 50% in somewhat less than one second. How the condition "rapid load change" is best determined for a specific case is to be determined through tests.

A suppression of the misfiring recognition also takes place within one transient time period after the start of the engine. This time period typically amounts to a few seconds. Here, as well, the best value for the specific case is to be determined through tests.

Errors in determining running-irregularity value can also be caused by interference signals. To prevent such errors when possible, one proceeds advantageously as follows. In a system that works optimally from the standpoint of measuring technique, misfirings are generated and disturbances, which lead to maximum running-irregularity values as can occur in practice, are introduced through the power train. These values are established as the maximum values for acceptable running-irregularity values. If greater single running-irregularity values occur in the operation of a motor vehicle, for example as the result of sensor interference signals, these values are limited to the maximum value, before the running-irregularity values are averaged, as described further above. Thus, disturbances which are not caused by running irregularity are prevented from having only a weak effect on the averaged value.

What is claimed is:

1. A method for detecting a misfire in an internal combustion engine of a vehicle having a plurality of cylinders, comprising the steps of:
   (a) measuring a first time period in which a crankshaft of the vehicle rotates by a predetermined angle for a first expansion stroke of the engine;
   (b) measuring a second time period in which the crankshaft rotates by the predetermined angle for a second expansion stroke of the engine;
   (c) measuring a third time period in which the crankshaft rotates by the predetermined angle for a third expansion stroke of the engine, at most two of the first, second, and third expansion strokes being adjacent;
   (d) subtracting the second time period from the third time period to form a first value;
   (e) subtracting the first time period from the second time period to form a second value;
   (f) subtracting the first value from the second value to form a third value;
   (g) multiplying the absolute value of the third value by a factor to form a running-irregularity value, the factor being based upon at least one of the first, second and third time periods;
   (h) repeating steps (a)–(g) at least once to form a plurality of running irregularity values;
   (i) changing at least one of the first, second and third expansion strokes of the engine to be measured to a different expansion stroke of the engine;
   (j) repeating steps (1)–(i) at least once to form a plurality of groups of running-irregularity values;
   (k) averaging the running-irregularity values in each of the plurality of groups to determine a corresponding plurality of average values;
   (l) determining a maximum value of the average values;
   (m) determining a minimum value of the rage values;
   (n) determining the difference between the maximum value and the minimum value; and
   (o) indicating a misfire when difference value exceeds a predetermined threshold value.

2. The method as recited in claim 1, wherein the first, second and third expansion strokes are of nonadjacent cylinders of the engine having the same crankshaft angular ranges.

3. The method as recited in claim 2, wherein each angular range extends between consecutive segment marks associated with the crankshaft, the number of segment marks equaling half the number of cylinders of the engine.

4. The method as recited in claim 1, wherein the factor is inversely proportional to at least one of the first second and third time periods.

5. The method as recited in claim 1, further comprising, after step (g), the step of limiting the running-irregularity value to an upper limit.

6. The method as recited in claim 1, wherein the threshold value is based upon the temperature of the engine.

7. The method as recited in claim 1, further comprising the step of suppressing the method during rapid load changes on the engine.

8. The method as recited in claim 1, further comprising the step of suppressing the method during a transient time period after the start of the engine.

9. The apparatus as recited in claim 1, wherein the first, second, and third expansion strokes are of nonadjacent cylinders of the engine having same crankshaft angular ranges.

10. The apparatus as recited in claim 9, wherein each angular range extends between consecutive segment marks associated with the crankshaft, the number of segment marks equaling at least half the number of cylinders of the engine.

11. An apparatus for detecting a misfire in an internal combustion engine of a vehicle having a plurality of cylinders and a crankshaft, comprising:
   (a) a crankshaft angular displacement mechanism including:
      (1) a detector wheel that rotates synchronously with the crankshaft,
      (2) a sensor that emits a signal when the detector wheel rotates a predetermined angle for an expansion stroke of each cylinder;
   (b) means for monitoring the sensor and indicating a first time period when the crankshaft rotates the predetermined angle for a first expansion stroke of the engine;
   (c) means for monitoring the sensor and indicating a second time period when the crankshaft rotates the predetermined angle for a second expansion stroke of the engine;
   (d) means for monitoring the sensor and indicating a third time period when the crankshaft rotates the predetermined angle for a third expansion stroke of the engine, with at most two of the first, second, and third expansion strokes being adjacent;
   (e) means for generating a plurality of groups of running irregularity values, the generating means generating each running irregularity value by
      (1) subtracting the second time period from the third time period to form a first value;
      (2) subtracting the first time period from the second time period to form a second value;
      (3) subtracting the first value from the second value to form a third value;
      (4) multiplying the absolute value of the third value by a predetermined valve to form a running-irregularity value, the predetermined value being based upon at least one of the first, second and third time periods;
   (f) means for operating according to step (e) to form a plurality of running irregularity values for a first of the plurality of groups of running irregularity values;
   (g) means for operating in a predetermined manner to change at least one of the first, second, or third expansion strokes of the engine to be measured to a different expansion stroke of the engine and operating in accordance with steps (e) and (f) to form each other one of a plurality of groups of running irregularity values;
   (h) means for averaging the running-irregularity values in each of the plurality of groups to determine a corresponding plurality of average values;
   (i) means for determining a maximum value of the average values;
   (j) means for determining a minimum value of the average values;
   (k) means for determining the difference between the maximum value and the minimum value; and
   (l) means for indicating a misfire when the difference value exceeds a predetermined threshold value.

12. The apparatus as recited in claim 11, wherein the factor is inversely proportional to at least one of the first, second, and third time periods.

13. The apparatus as recited in claim 11, further comprising means for limiting each runningirregularity value to a predetermined upper limit.

14. The apparatus as recited in claim 11, wherein the threshold value is based upon a temperature the engine.

15. The apparatus as recited in claim 11, further comprising means for suppressing the generation of running irregularity values during rapid load changes on the engine.

16. The apparatus as recited in claim 11, further comprising means for suppressing the generation of running irregularity values during a transient time period after the start of the engine.

* * * * *

UNITED STATES PATENT AND TRADEMARK OFFICE
CERTIFICATE OF CORRECTION

PATENT NO. : 5,255,560
DATED : October 26, 1993
INVENTOR(S) : KLENK et al.

It is certified that error appears in the above-indentified patent and that said Letters Patent is hereby corrected as shown below:

In the Abstract, line 3, "runningirregularity" should be --running-irregularity--;

Column 1, line 34, "al" should be --et al--;
Column 1, line 34, "an" should be --as an--;
Column 1, line 40, "T V2" should be --T_V2--;
Column 1, line 45, "),1" should be --)1,--;
Column 1, line 48, "T_v2" should be --T_V2--;
Column 1, lines 50 and 62, "runningirregularity" should be --running-irregularity;
Column 4, line 5, "runningirregularity" should be --running-irregularity--;
Column 4, line 17, "$f\_($" should be --$f($--;
Column 6, line 10, "runningirregularity" should be --running-irregularity--;
Column 7, lines 24 and 25, "runningirregularity" should be --running-irregularity--;

UNITED STATES PATENT AND TRADEMARK OFFICE
CERTIFICATE OF CORRECTION

PATENT NO. : 5,255,560

DATED : October 9, 1963

INVENTOR(S) : KLENK et al.

It is certified that error appears in the above-indentified patent and that said Letters Patent is hereby corrected as shown below:

Column 10, line 40, "according to" should be --of--;

Column 11, line 30 "(1)" should be --(a)--;

Column 11, line 38, "rage" should be --average--;

Column 11, line 40, after "when" insert --the--;

Column 12, line 42, "valve" should be --value--;

Column 13, line 5, "runningirregularity" should be --running-irregularity--.

Signed and Sealed this

Fourteenth Day of March, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,255,560         Page 1 of 2
DATED : October 26, 1993
INVENTOR(S) : KLENK et al.

It is certified that error appears in the above-indentified patent and that said Letters Patent is hereby corrected as shown below:

In the Abstract, line 3, "runningirregularity" should be --running-irregularity--;

Column 1, line 34, "al" should be --et al--;

Column 1, line 34, "an" should be --as an--;

Column 1, line 40, "T V2" should be --T_V2--;

Column 1, line 45, "),1" should be —)1,—;

Column 1, line 48, "T_v2" should be --T_V2--;

Column 1, lines 50 and 62, "runningirregularity" should be --running-irregularity;

Column 4, line 5, "runningirregularity" should be --running-irregularity--;

Column 4, line 17, "$f_{-}($" should be --$f($--;

Column 6, line 10, "runningirregularity" should be --running-irregularity--;

Column 7, lines 24 and 25, "runningirregularity" should be --running-irregularity--;

UNITED STATES PATENT AND TRADEMARK OFFICE
CERTIFICATE OF CORRECTION

PATENT NO. : 5,255,560
DATED : October 26, 1993
INVENTOR(S) : KLENK et al.

It is certified that error appears in the above-indentified patent and that said Letters Patent is hereby corrected as shown below:

Column 10, line 40, "according to" should be --of--;

Column 11, line 30 "(1)" should be --(a)--;

Column 11, line 38, "rage" should be --average--;

Column 11, line 40, after "when" insert --the--;

Column 12, line 42, "valve" should be --value--;

Column 13, line 5, "runningirregularity" should be --running-irregularity--.

This certificate supersedes Certificate of Correction issued March 14, 1995.

Signed and Sealed this

Eighteenth Day of June, 1996

Attest:

BRUCE LEHMAN

*Attesting Officer*   *Commissioner of Patents and Trademarks*